May 20, 1958  S. J. KOLNER  2,835,598
SEPARATION OF CRYSTALLIZATION
Filed Dec. 30, 1954

INVENTOR.
S. J. KOLNER

BY Hudson and Young

ATTORNEY

United States Patent Office 2,835,598
Patented May 20, 1958

2,835,598

SEPARATION BY CRYSTALLIZATION

Samuel J. Kolner, Phillips, Tex., assignor to Phillips Petroleum Company, a corporation of Delaware Application December 30, 1954, Serial No. 478,688

10 Claims. (Cl. 99—205)

This invention relates to the separation of components of mixtures by crystallization. In one of its more specific aspects the invention relates to an improved apparatus for the control of a fractional crystallizer. In another of its more specific aspects the invention relates to an improved method for controlling the separation of components of mixtures by fractional crystallization.

The separation of components of mixtures can be effected by various methods including distillation, solvent extraction and crystallization. Although distillation and extraction are generally preferred because of economy and convenience of operation, there are some instances in which such processes cannot be successfully utilized. For example, many chemical isomers have similar boiling points and similar solubility characteristics and therefore cannot be separated satisfactorily by distillation or extraction. Furthermore components of some mixtures form azeotropes so that, even though their boiling points vary considerably, they cannot successfully be separated by distillation.

Fractional crystallization has one great advantage over other methods of separation in that it is the only separation method which theoretically produces a pure product in a single stage of operation in systems in which the desired component of a mixture solidifies at temperatures above which the other components solidify. Thus, whereas distillation and extraction theoretically require infinite stages for a pure product, crystallization in many cases requires only one. This is because phase equilibrium occurs in distillation and extraction steps, whereas in crystallization, substantially pure crystals can be separated from solutions in one stage, regardless of liquid compositions. Crystallization is thus well suited, not only to the separation of many chemical isomers which can be separated by no other means, but also to the purification of many compounds which cannot be purified economically by other means.

Even though, as above stated, one stage of crystallization theoretically offers a pure product, attainment of this ideal separation has been difficult. Complete removal of occluded impurities without substantial loss in yield is required for attainment of the one stage separation.

Methods of separating the pure compound from a mixture have been devised, one of which is disclosed by J. Schmidt, Re. 23,810, whereby the mixture to be separated is introduced into a heat exchange zone wherein the mixture is cooled so that a slurry of crystals is formed and that slurry of crystals is then introduced into a purification chamber through which the crystals are moved as a compact mass, to a melting zone wherein the crystals are melted. A portion of the melt is displaced countercurrently through at least a portion of the crystal mass so as to displace occluded impurities from the mass approaching the melting zone. The exact mechanism, whereby this displaced liquid corresponding to the melt, improves the purity of the final product, is not completely understood. However, it is presently believed that the substantially pure material which is refluxed through at least a portion of the crystal mass displaces occluded impurities from the crystal mass approaching the melting zone and replaces the impurities in the interstices. At least a portion of the pure material is refrozen on the surface of the crystals. A high yield of product is obtained since the high melting product refreezes from the reflux stream as it comes in contact with the cold crystal mass moving toward the melting zone. Thus, the portion of the crystal mass which approaches the melting zone does not contain any appreciable amount of occluded impurities and the resulting product which is removed from the melting zone is of extremely high purity. It is desirable for best operation of such a purification system to remove as much of the unfrozen material (mother liquor) from the crystals as possible prior to introducing the crystals into the purification chamber. In this manner, many of the impurities can be eliminated from the purification system before subjecting the crystals to the final purification step.

In the operation of the above described method of crystal purification the feed temperature and the product temperature are maintained substantially constant whereas the mother liquor outlet temperature and the column base pressure vary throughout the cycle of the reciprocating piston. When the piston is moved to its retracted position the column base pressure is reduced from its maximum pressure of 80 to 100 p. s. i. g. to a pressure of slightly less than atmospheric. The crystal feed to the column then raises the column pressure to that of the feed pressure which is usually 20 to 40 p. s. i. g. The compacting stroke of the piston then raises the pressure to its maximum, and this pressure is maintained substantially constant during the compaction stroke.

The temperature of the mother liquor at the column outlet is at a minimum when the column is being filled with crystals and at the start of the compacting stroke. This minimum temperature will usually be from 0.5 to 1.5° C. higher than the feed temperature. During the compacting stroke the temperature of the mother liquor at the column outlet rises to its maximum which will usually be in the range of about 4 to 8° C. higher than the feed temperature but may be as much as 15° C. higher than the feed temperature.

In order to separate the constituents of certain mixtures by fractional crystallization, it is necessary to adjust the temperature of the mixture to a temperature which is far below the temperature at which crystals of any one of the pure constituents would form. For example, when para-xylene, which has a freezing point of about 13° C., is separated from a mixture of isomeric $C_8$ alkylbenzenes, it is necessary to cool the mixture to a temperature in the neighborhood of about —57 to about —78° C. The crystals obtained from this cooling step, after removal of the mother liquor by filtration, centrifugation, or other means, are then, at least in part, remelted to produce a more concentrated solution of para-xylene. This material, which is usually a slurry of crystals and mother liquor is introduced into the crystal purification zone.

The purity of the product from a crystal purification device as above described is governed by the effectiveness of the washing action of the reflux which passes in countercurrent relationship to the passage of the compact crystal mass. I have discovered that the temperature of the mother liquor as it is withdrawn from the purification zone is indicative of the effectiveness of the purification. When the temperature of the mother liquor too closely approaches the temperature of the feed to the purification zone, insufficient countercurrent washing is taking place. As a result, the purity of the product is low. Conversely, if the mother liquor temperature is very much in excess of the feed temperature this is an indication of channeling of pure product through portions of the crystal bed. This also results in loss of product purity.

I have found that superior performance of the crystal purification device results when the mother liquor temperature is controlled at a value somewhat above the feed temperature but below a temperature at which channeling occurs.

It is an object of this invention to provide an improved system for the separation of a pure component from liquid mixtures.

It is another object of the invention to provide an improved process for the separation of a pure component of a liquid mixture.

Another object of the invention is the provision of a system for controlling the purity of the product of a fractional crystallization device.

It is another object of the invention to provide a simple and efficient method for controlling the purity of the product of a crystal purification device.

Other and further objects and advantages of the invention will be apparent to those skilled in the art upon study of the disclosure of the invention.

A better understanding of the invention can be attained by reference to the drawing wherein.

Figure 1:
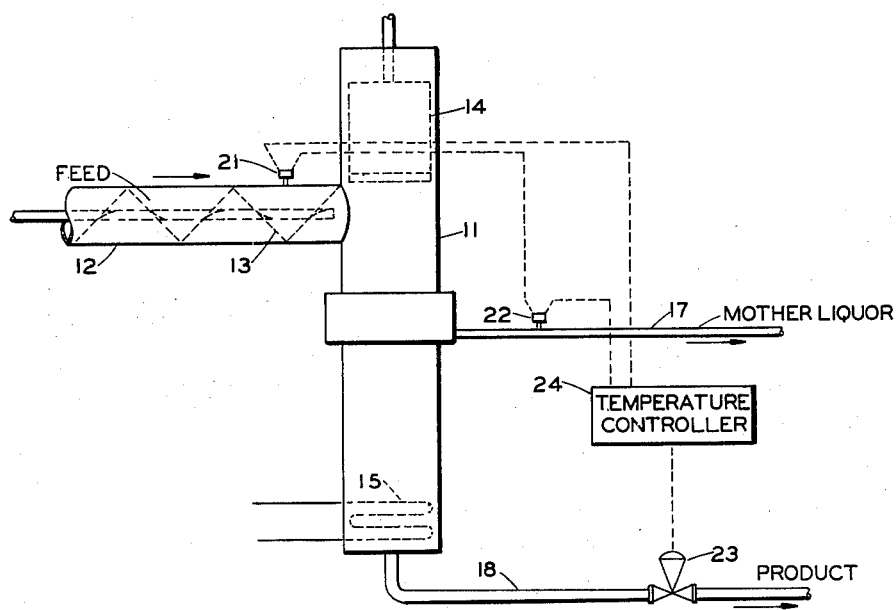
Figure 1 illustrates a preferred modification of the invention.

Broadly speaking, this invention resides in an improved method and means for controlling the purity of the product from a crystal purification device. I have devised a method for controlling the reflux in the crystal bed, by controlling the pressure on the base of the column so as to maintain the mother liquor outlet temperature substantially constant. Thus, as the pressure on the base of the column tends to force an excessive amount of reflux through the crystal bed and thus to raise the mother liquor outlet temperature, the product withdrawal rate is increased so as to relieve the pressure on the base of the column and reduce the reflux. This method of operation provides the maximum rate of product recovery, at the desired purity. Since the effectiveness of the reflux is determined by the relationship of the mother liquor outlet temperature and the feed temperature, I prefer to control the column base pressure according to the difference of the feed temperature and the mother liquor outlet temperature. The control of pressure can conveniently be obtained by controlling the product withdrawal rate. One advantage of this preferred method of pressure control is that the same process, utilizing the purification column hereinbelow described, can be used for the purification of different materials because, while the operating temperatures will differ for different materials, the desired temperature differences between the feed and the mother liquor outlet will be fairly constant. In normal operation of the purification column, for any given feed material, the temperature of the feed will remain substantially constant and therefore, a measure of the mother liquor outlet temperature will reflect the temperature differential existing between the feed and the mother liquor outlet. Thus in one modification of my invention I control coumn pressure according to the temperature of the mother liquor outlet.

A slight closure of the product withdrawal line valve will tend to reduce the amount of product withdrawn but will also tend to increase the pressure within the purification zone and the pressure effect is believed to have more effect on controlling the purity of product than the slight change in product withdrawal rate. The rate of heat added to the purification zone determines the rate of product made and the pressure on the purification zone controls the rate of reflux. Therefore, in the practice of this invention, the reflux rate is controlled according to the mother liquor outlet temperature or according to the difference in feed and mother liquor outlet temperatures. The reflux rate is preferably controlled by the pressure on the purification zone through control of product withdrawal.

My novel control system takes advantage of an apparent interrelation of column pressure and product withdrawal rate so that the effects of both are utilized in obtaining a process control which produces a high yield of high purity product.

The method and apparatus of this invention can be advantageously utilized in practically any system to which fractional crystallization is applicable. This invention is applicable to separations in many multi-component systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say, 15 to 25 percent purity, so as to effect a purity upwards of 98 percent. In order to illustrate some of the systems to which the invention is applicable, the following compounds are grouped with respect to their boiling points.

| | B. P., °C. | F. P., °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |
| Group C: | | |
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon Tetrachloride | 77 | −22.8 |
| Chloroform | 61 | −63.5 |
| CS₂ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | <−25 |
| Para-cymene | 176.0 | −73.5 |
| Group H: | | |
| Dimethyl phthalate | 282 | 5.5 |
| Dimethyl isophthalate | 124 | 67 |
| | (12 mm.) | |
| Dimethyl terephthalate | 288 | 140.6 |
| Group I: | | |
| Ortho-nitrotoluene | 222.3 | α−10.6 / β−4.1 |
| Meta-nitrotoluene | 231 | 15.5 |
| Para-nitrotoluene | 238 | 51.3 |

Systems consisting of any combination of two or more of the components within any one of the groups may be separated by the process of the invention, as well as systems made up of components selected from different groups: for example, benzene may be separated from a benzene, n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from admixture with toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone (1,4-benzenediol), para-cresol, para-dichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

Figure 2:
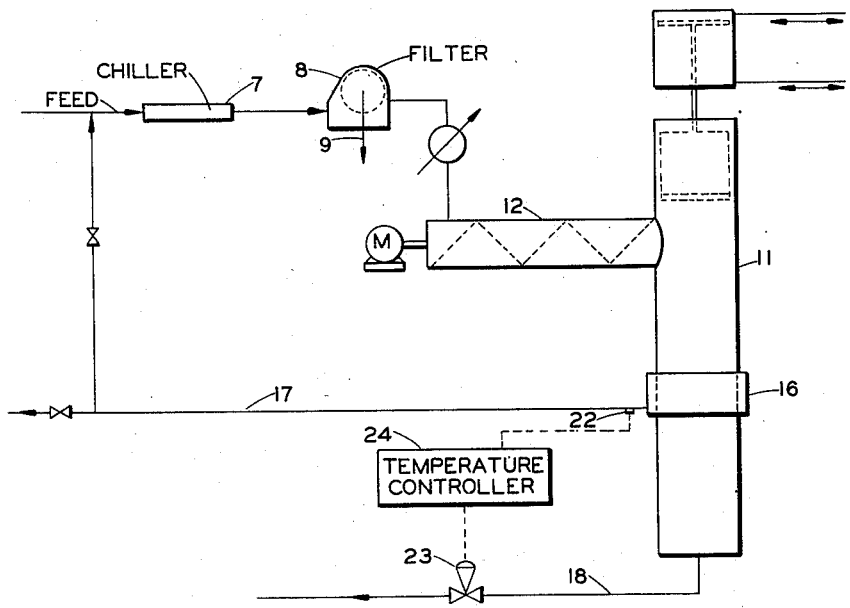
Figure 2 is a schematic illustration of the process utilizing the invention.

Referring now to the drawing, particularly Figure 2, a mixture of material from which at least one constituent is to be separated is cooled, in chiller 7, to a temperature sufficiently low so as to crystallize at least a portion of the constituent to be separated from the mixture. The resulting slurry of crystals and mother liquor is filtered in filter 8, and the first stage mother liquor removed is withdrawn through line 9. The crystal mass, containing some first stage mother liquor, is fed to crystal purification column 11 through conveyor 12.

Referring now to Figure 1, the slurry of crystals and mother liquor is introduced into column 11 by any positive and economical means, for example, screw conveyor 13. Piston 14 travels in purification column 11 so as to compact the crystal mass in column 11 and to force the compacted mass of crystals toward the opposite end of the column where a predetermined amount of heat is added to the column by means of heater 15. Heater 15 can be a steam coil, an electrical resistance heater, or other known heating means. A means for separating second stage mother liquor from solid crystals and removing the mother liquor from the purification column is located intermediate the heated portion of the column and the compacting piston 14. The separation means is indicated at 16 and can conveniently be comprised of a perforated section of the purification column, adapted to act as a filter, surrounded by a bustle ring. The second stage mother liquor removed through separation means 16 is usually returned to the cooling step through line 17 although this material can be removed from the system if desired. Melted product is removed from the heated end portion of the column through line 18. Piston 14 is actuated by conventional means, such as by a hydraulic piston and cylinder as shown in Figure 2.

The temperature of the feed to the column is determined by temperature sensitive element 21 and the temperature of the second stage mother liquor leaving the purification column through line 17 is determined by temperature sensitive element 22. Elements 21 and 22 can be any temperature sensitive device such as thermocouples. Control valve 23 regulates the withdrawal of product and maintains a controlled back pressure on purification column 11. Valve 23 is controlled by temperature controller 24 which is operatively connected to temperature sensitive elements 21 and 22 so as to control the back pressure on column 11 in accordance with the temperature differences existing between elements 21 and 22. Valve 23 can also be controlled by the outlet temperature of the second stage mother liquor in which case temperature sensitive element 21 can be omitted, as shown in Figure 2. Valve 23 can be any conventional throttling valve adapted for automatic control purposes. Temperature controller 24 can be any device adapted to control valve 23 in response to a temperature difference existing between two points, or in response to a temperature measured at a single point. Valve 23 also can be operated by a pressure controller which in turn is reset by temperature controller 24. These controllers are commercially available in a variety of forms.

Although the purification column shown in the drawing is operated in a vertical position, such purification column can be operated in any position including an inverted position. A better understanding of the invention may be obtained by reference to the following example which is intended to exemplify but not unduly restrict my invention.

*Example*

A feed mixture comprising 17 percent by weight para-xylene, 17.5 percent by weight ortho-xylene, 33.4 percent by weight meta-xylene, 27.5 percent by weight ethylbenzene and 4.6 percent by weight toluene is supplied to the cooling zone at the rate of 857 gallons per hour. Liquid material recovered from column 11 through separation means 16 and line 17 contains about 40 percent para-xylene. This stream is also supplied to the cooling zone at a rate of 128 gallons per hour so that the total feed to the cooling zone is 985 gallons per hour. That material is cooled to a temperature of $-70°$ C. with the resultant formation of about 15 percent solids. The slurry of mother liquor and crystals is passed to the filtering zone and 769 gallons per hour of first stage mother liquor containing about 6 percent by weight of para-xylene is removed from the filtering zone. The crystals recovered from the filtering zone comprise the feed to the crystal purification column and are introduced into the purification column through inlet 12 in the form of a slurry of crystals and mother liquor resulting from melting the crystals at about 1° C. and cooling the resulting melt to about $-10°$ C. The feed to column 11 is 216 gallons per hour of a slurry containing 40 percent by weight solids.

Compacting piston 14 is operated by a conventional power source such as a hydraulic piston and cylinder in such manner that the compacting stroke requires from 20 to 120 seconds and the retracting stroke requires from 3 to 5 seconds. Heat is added to the end portion of the purification column so as to maintain the desired product rate. Second stage mother liquor is withdrawn from the column through separation means 16 and line 17 at the rate of 128 gallons per hour and at a temperature of about $-10°$ C. The melted portion is removed from the purification column through line 18 at the rate of 88 gallons per hour and a temperature of about 27° C.

Temperature controller 24 is adjusted so as to maintain the temperature of the second stage mother liquor leaving the column via line 17 within the range of 0.5 to 2° C. higher than the temperature of the feed to the purification column. When the temperature of the second stage mother liquor leaving the column tends to rise above the predetermined limits, back pressure regulator operates so as to open valve 23 and thus lower the pressure on column 11. This also removes melted product at a slightly increased rate thus removing heated materials from the column and thus helping to reduce second stage mother liquor exit temperature. When this temperature tends to go below the minimum limit the temperature controller 24 operates so as to close valve 23 thus increasing the back pressure on column 11 and also tending to reduce the removal of melted products from column 11 and thus to reduce the removal of heat from the column.

The pressure in column 11 is about 100 p. s. i. g. at the start of the compacting stroke of the piston and decreases to about 40 p. s. i. g. at the end of the compacting stroke, but is of course substantially reduced during the retracting stroke of the piston. Thus, control of the column is accomplished during the compacting piston strokes.

The product removed through line 18 contains about 99 percent by weight para-xylene.

Variations and modifications are possible within the scope of the disclosure of the present invention, the essence of which is an improved method for controlling a fractional crystallization process by controlling product withdrawal and back pressure according to the temperature of the mother liquor withdrawn from the column or the difference in feed and mother liquor temperatures.

That which is claimed is:

1. In apparatus wherein a means is utilized to move crystals through an elongated crystal purification chamber having a crystal inlet, a mother liquor outlet and a product outlet, the improvement comprising means for determining the temperature differential between said crystal inlet and said mother liquor outlet; and means for controlling withdrawal of product from said product outlet in response to said temperature differential.

2. In apparatus wherein a means is utilized to move crystals through an elongated crystal purification chamber having a crystal inlet; a mother liquor outlet and a product outlet, the improvement comprising means for determining the temperature of mother liquor at said mother liquor outlet; and means for controlling withdrawal of product from said product outlet in response to said temperature.

3. In apparatus wherein a piston is utilized to move crystals through an elongated crystal purification chamber having a crystal inlet, a mother liquor outlet and a product outlet, the improvement which comprises a first temperature responsive means in temperature relationship with said crystal inlet; a second temperature responsive means in temperature relationship with said mother liquor outlet; valve means in said product outlet; and means adapted so as to close said valve when the temperature difference existing between said temperature responsive means reaches a predetermined minimum value and to open said valve when the temperature difference existing between said temperature responsive means reaches a predetermined maximum value.

4. In apparatus wherein a piston is utilized to move crystals through an elongated crystal purification chamber having a crystal inlet; a mother liquor outlet and a product outlet, the improvement which comprises a temperature responsive means in temperature relationship with said mother liquor outlet; valve means in said product outlet; and means operatively connected to said temperature responsive means and adapted so as to close said valve means when the temperature reaches a predetermined minimum value and to open said valve when the temperature reaches a predetermined maximum value.

5. In a process for fractional crystallization wherein a crystal mass containing some mother liquor is introduced into a purification zone and moved to a heated portion of said zone so that a first portion of resulting melt is caused to be displaced countercurrently through at least a portion of the crystal mass, a mother liquor stream is removed from the system and a second portion of the melt is removed from the system as product, the improvement which comprises determining the temperature differential existing between the crystals introduced to the purification zone and the mother liquor removed from the purification zone; increasing the rate of product removal when said temperature differential reaches a predetermined maximum value; and decreasing said rate when said temperature differential reaches a predetermined minimum value.

6. In a process for fractional crystallization wherein a crystal mass containing some mother liquor is introduced into a purification zone and moved to a heated portion of said zone so that a first portion of resulting melt is caused to be displaced countercurrently through at least a portion of the crystal mass and a displaced liquid stream is removed from the system and a second portion of the melt is removed from the system as product, the improvement which comprises determining the temperature of said displaced liquid stream removed from the system; increasing the rate of product removal when said temperature reaches a predetermined maximum value; and decreasing said rate when said temperature reaches a predetermined minimum value.

7. A process for fractional crystallization which comprises introducing a mixture of crystals and mother liquor into a purification zone; moving said crystals as a compact mass through said purification zone to a melting zone; melting a portion of said crystal mass; displacing a first portion of resulting melt countercurrently through at least a portion of said crystal mass; removing displaced mother liquor from said purification zone; removing a second portion of said melt from said purification zone as product; determining the temperature of the mixture introduced to said purification zone; determining the temperature of the displaced mother liquor removed from the purification zone; reducing the rate of product removal when the difference between the two temperatures reaches a predetermined minimum value; and increasing the rate of product removal when the difference between the two temperatures reaches a predetermined maximum value.

8. A process for fractional crystallization which comprises introducing a mixture of crystals and mother liquor into a purification zone; moving said crystals as a compact mass through said purification zone to a melting zone; melting a portion of said crystal mass; displacing a first portion of resulting melt countercurrently through at least a portion of said crystal mass; removing displaced mother liquor from said purification zone; removing a second portion of said melt from said purification zone as products; determining the temperature of the mother liquor removed from the purification zone; reducing the rate of product removal when said temperature reaches a predetermined minimum value; and increasing the rate of product removal when said temperature reaches a predetermined maximum value.

9. In a process for fractional crystallization wherein a crystal and mother liquor slurry is introduced into a purifying zone and moved to a heated portion of said zone so that a first portion of resulting melt is caused to be displaced countercurrently through at least a portion of the crystal mass, a mother liquor stream is removed from the purifying zone and a second portion of the melt is removed from the purifying zone as product, the improvement which comprises increasing the rate of product removal when the temperature differential existing between the slurry introduced into the purifying zone and the mother liquor removed from the purifying zone reaches a predetermined maximum value, and decreasing said rate when said temperature differential reaches a predetermined minimum value.

10. In a process for fractional crystallization wherein a crystal and mother liquor slurry is introduced into a purification zone and moved to a heated portion of said zone so that a first portion of resulting melt is caused to be displaced countercurrently through at least a portion of the crystal mass, a displaced liquid stream is removed from the purification zone and a second portion of the melt is removed from the purification zone as product, the improvement which comprises increasing the rate of product removal when the temperature of the mother liquor removed from the purification zone reaches a predetermined maximum value and decreasing said rate when said temperature reaches a predetermined minimum value.

References Cited in the file of this patent

UNITED STATES PATENTS

| 2,236,087 | Detwiler | Mar. 26, 1941 |
| 2,617,274 | Schmidt | Nov. 11, 1952 |